US008515420B2

(12) United States Patent
Mann et al.

(10) Patent No.: US 8,515,420 B2
(45) Date of Patent: Aug. 20, 2013

(54) ORGANIZATION OF ROAMING PARTNER REALMS INTO PRIMARY AND SECONDARY

(75) Inventors: Robert A. Mann, Carp (CA); Lui Chu Yeung, Kanata (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/275,446

(22) Filed: Oct. 18, 2011

(65) Prior Publication Data

US 2013/0095825 A1    Apr. 18, 2013

(51) Int. Cl.
*H04W 4/00* (2009.01)
(52) U.S. Cl.
USPC ............ 455/432.3; 455/456.1; 455/413; 455/415; 455/406
(58) Field of Classification Search
USPC ............... 455/132.1, 432.3, 413, 415, 406, 455/456.1; 370/230, 235, 395.21; 726/1, 726/12, 14
See application file for complete search history.

(56) References Cited

U.S. PATENT DOCUMENTS

| 7,835,317 | B2 | 11/2010 | Ahmavaara et al. | |
|---|---|---|---|---|
| 2007/0226775 | A1* | 9/2007 | Andreasen et al. | 726/1 |
| 2008/0046963 | A1* | 2/2008 | Grayson et al. | 726/1 |
| 2011/0161504 | A1 | 6/2011 | Zhou et al. | |
| 2012/0100849 | A1* | 4/2012 | Marsico | 455/432.1 |

FOREIGN PATENT DOCUMENTS

| EP | 2339781 A1 | 6/2011 |
|---|---|---|
| WO | 2011020541 A1 | 2/2011 |

OTHER PUBLICATIONS

Zheng et al. (Mobile Networks and Applications 9, 235-241, 2004; Kluwer Academic Publishers).*

3GPP TS 29.212, v9.3.0 (2009), "3rd Generation Partnership Project; Technical Specification Group Core Network and Terminals; Policy and Charging Control Over Gx Reference Point (Release 9)", pp. 1-114.
3GPP TS 29.213, v8.6.0 (2009), "3rd Generation Partnership Project; Technical Specification Group Core Network and Terminals; Policy and Charging Control Signalling Flows and QoS Parameter Mapping (Release 8)", pp. 1-122.
3GPP TS 29.214 v9.2.0 (2009), "3rd Generation Partnership Project; Technical Specification Group Core Network and Terminals; Policy and Charging Control Over Rx Reference Point (Release 9)", pp. 1-44.
3GPP Ts 29.215 v10.2.0 (2011), "3rd Generation Partnership Project; Technical Specification Group Core Network and Terminals; Policy and Charging Control (PCC) Over S9 Reference Point; Stage 3 (Release 10)", pp. 1-42.
ETSI TS 129 215 V9.7.0, Policy and Charging Control (PCC) over S9 reference point, Stage 3, (3GPP TS 29.215 version 9.7.0 Release 9), Jun. 2011 (06, 2011).
International Search Report for PCT/CA2012/050727 dated Oct. 16, 2012.

* cited by examiner

*Primary Examiner* — Manpreet Matharu
(74) *Attorney, Agent, or Firm* — Kramer & Amado P.C.

(57) ABSTRACT

Various exemplary embodiments relate to a method performed by a policy and charging rules node (PCRN) of communicating with a roaming partner. The method may include: defining a roaming partner profile including a network identifier and a primary realm; receiving a session establishment request at the PCRN; extracting a subscription identifier from the session establishment request; determining an active roaming partner by comparing the subscription identifier to the network identifier; and establishing an S9 session with the primary realm of the active roaming partner. Another method may include: defining a roaming partner profile including a primary realm and at least one secondary realm; receiving an S9 session establishment request; extracting an origin realm from the S9 session establishment request; determining an active roaming partner by comparing the origin realm to the primary realm and the secondary realms of the roaming partner profile; and responding to the S9 session establishment request.

18 Claims, 7 Drawing Sheets

ORGANIZATION OF ROAMING PARTNER REALMS INTO PRIMARY AND SECONDARY

TECHNICAL FIELD

Various exemplary embodiments disclosed herein relate generally to telecommunications networks.

BACKGROUND

A communications network of a network provider usually has a limited geographical range where it can provide communications services. Network subscribers usually subscribe to a single network. When a network subscriber is outside of the geographical range of the subscribed network, another network provider may provide network service to the subscriber, who is then considered a roaming subscriber. The subscriber's home network and the visited network must negotiate in order to provide network service to the subscriber and correctly apportion the costs of the service.

In view of the foregoing, it would be desirable to provide a method for providing network service to a roaming subscriber. In particular, it would be desirable to provide a network node and method for negotiating the service for the roaming subscriber with the other network.

SUMMARY

In light of the present need for a method for providing network service to a roaming subscriber, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) of communicating with a roaming partner. The method may include: defining a roaming partner profile including at least one network identifier and a primary realm; receiving a session establishment request at the PCRN; extracting a subscription identifier from the session establishment request; determining an active roaming partner by comparing the subscription identifier to the at least one network identifier of the roaming partner profile; and establishing an S9 session with the primary realm of the active roaming partner by forwarding the session establishment request to the roaming partner.

In various alternative embodiments, the roaming partner profile includes at least one secondary realm. The subscription identifier may include a combination of Mobile Country Code (MCC) and a Mobile Network Code (MNC) that corresponds to a secondary realm, wherein the primary realm is associated with a different combination of MCC and MNC than the subscription identifier and the secondary realm. The primary realm may be the only publicly addressable realm of the roaming partner. The method may also include configuring a Diameter route for only the primary realm of a roaming partner. The roaming partner may internally route Diameter messages to a secondary realm.

Various exemplary embodiments relate to a method performed by a policy and charging rules node (PCRN) of communicating with a roaming partner. The method may include: defining a roaming partner profile including a primary realm and at least one secondary realm; receiving an S9 session establishment request via an S9 interface; extracting an origin realm from the S9 session establishment request; determining an active roaming partner by comparing the origin realm to the primary realm and the at least one secondary realm of the roaming partner profile; and responding to the S9 session establishment request based on the active roaming partner.

In various alternative embodiments, the step of responding to the S9 session establishment request may include sending a message to the origin realm of the received S9 session establishment request. In various alternative embodiments, the step of responding to the S9 session establishment request may include generating a PCC rule providing a roaming subscriber with access to a network. In various alternative embodiments, the step of responding to the S9 session establishment request may include denying the S9 session establishment request if the origin realm does not correspond to a roaming partner.

Various exemplary embodiments may relate to the above described methods encoded as instructions on a non-transitory machine-readable medium. The non-transitory machine-readable medium may include instructions that if executed by a processor of a network node perform the above described method.

It should be apparent that, in this manner, various exemplary embodiments enable methods for providing network service to a roaming subscriber. In particular, by organizing roaming partner realms into primary and secondary realms, the PCRN negotiate the service for the roaming subscriber with the network of a roaming partner.

BRIEF DESCRIPTION OF THE DRAWINGS

In order to better understand various exemplary embodiments, reference is made to the accompanying drawings, wherein.

DETAILED DESCRIPTION

A roaming subscriber poses difficulties for a visited public land mobile network (VPLMN) because the network operator has little information about the subscriber. The VPLMN must make policy decisions for provisioning a session for the roaming subscriber based on the little information it has. The 3GPP specifications direct a VPLMN to communicate with the subscriber's home public land mobile network (HPLMN) to obtain the PCC and/or QoS rules necessary to establish a session for the subscriber.

The 3GPP specifications suggest using network identification information such as a Mobile Country Code (MCC) and Mobile Network Code (MNC) to derive the realm of the HPLMN. This approach suffers from several limitations. First, a service provider, particularly large service providers, may use multiple MNCs and even multiple MCCs. A service provider with multiple MNC/MCC combinations may wish to designate a single publicly addressable realm for processing all requests for roaming subscribers. This approach may simplify configuration and provide less information to roaming partners, who may also be competitors. Second, a derived realm may be incompatible with non-3GPP nodes and previous releases. For example, CDMA nodes may use an NAI that cannot be used to derive a realm. Also, a partner PCRN implemented according to a previous 3GPP release may not recognize derived realms. Finally, service providers may desire flexible configuration and may not follow the suggested approach.

Organizing roaming partner realms into primary and secondary realms at the PCRN may allow a service provider to configure communications between partner devices. The PCRN may limit outgoing S9 requests to a single primary destination realm for each roaming partner. The PCRN may recognize incoming S9 requests from any realm used by a roaming partner. A network operator may configure roaming partner profiles to associate different network and subscription identifiers with a roaming partner. As a roaming partner changes network infrastructure, for example, by merging with another service provider, a network operator may easily update the roaming partner profile.

Referring now to the drawings, in which like numerals refer to like components or steps, there are disclosed broad aspects of various exemplary embodiments.

Figure 1:
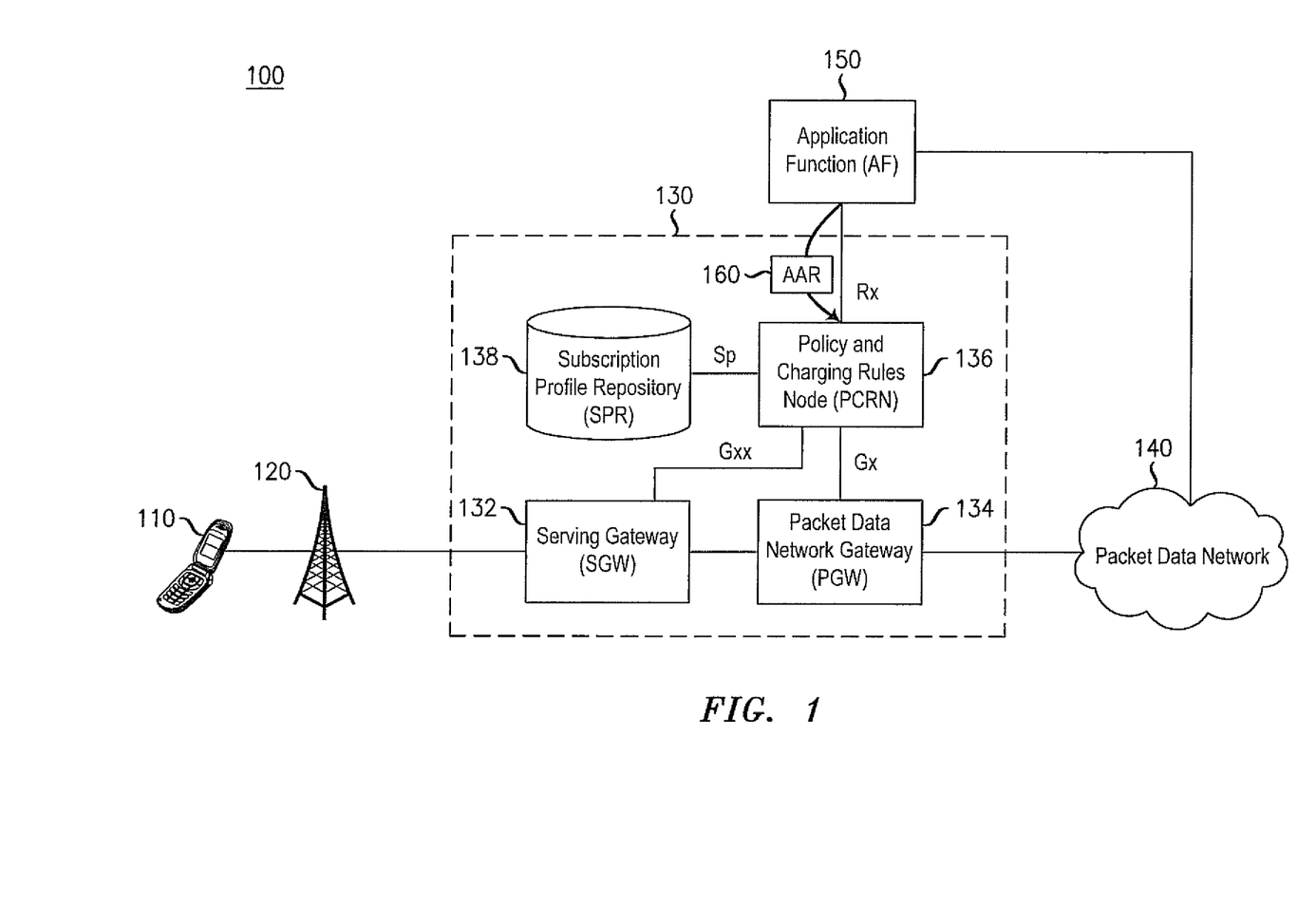
FIG. 1 illustrates an exemplary subscriber network.

FIG. 1 illustrates an exemplary subscriber network 100 for providing various data services. Exemplary subscriber network 100 may be telecommunications network or other network for providing access to various services. In various embodiments, subscriber network 100 may be a public land mobile network (PLMN). Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
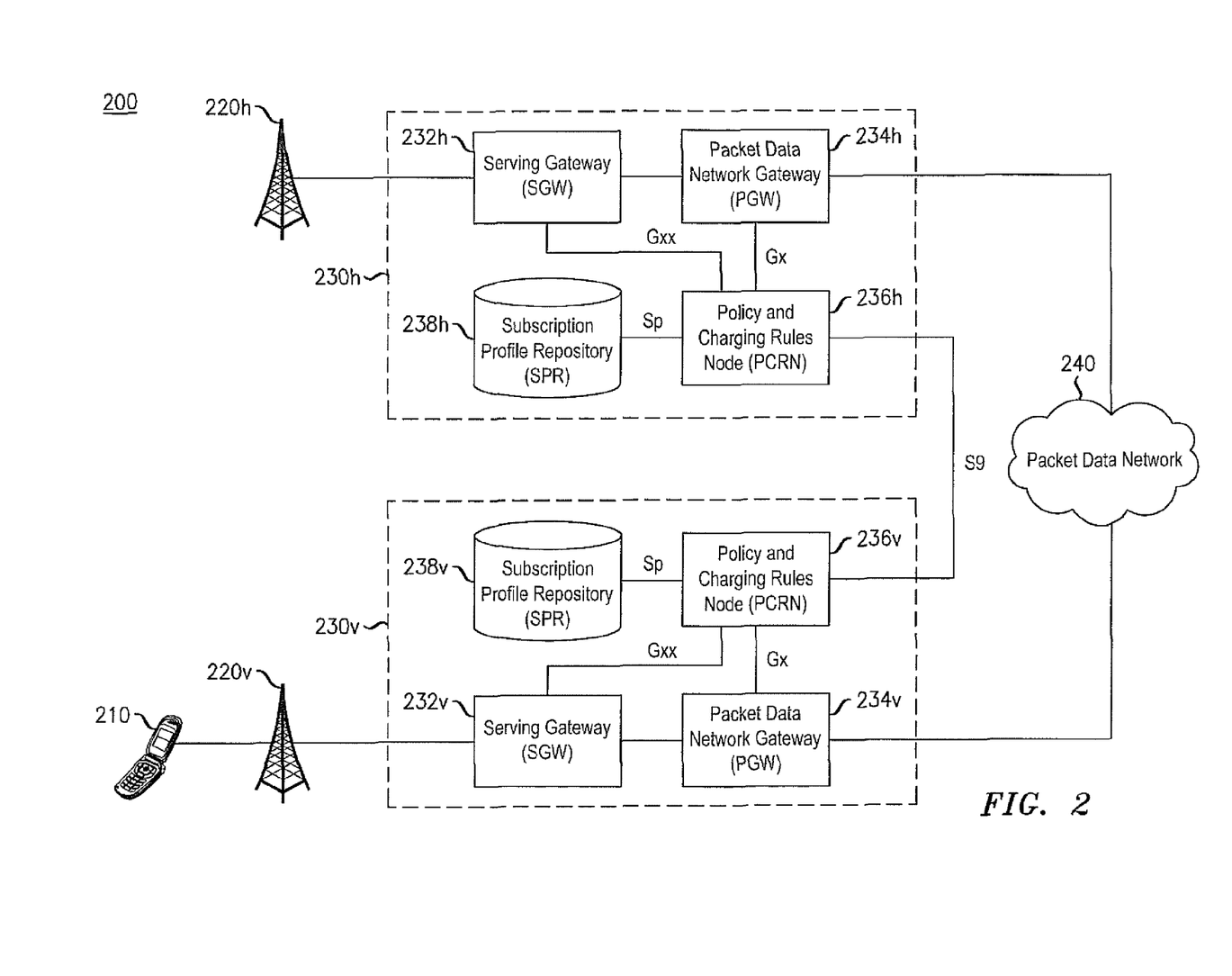
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. In various embodiments, EPC 230v and EPC 230h may connect to the same packet data network 240 (as shown) or may connect to two independent networks (not shown). Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) of the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via an S9 session.

In various embodiments, PCRN 236v may forward requests associated with UE 210 to PCRN 236h via an S9 session. PCRN 236h may process these messages to, for example, generate PCC and/or QoS rules. PCRN 236h may then forward these rules to PCRN 236v for installation on PGW 234v and/or SGW 232v. In the case of home-routed access, PCRN 236h may also install PCC rules directly on PGW 234h. In view of the cooperative nature of PCRNs 236h, 236v, these devices may be referred to as "partner devices" with respect to each other.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

Figure 3:
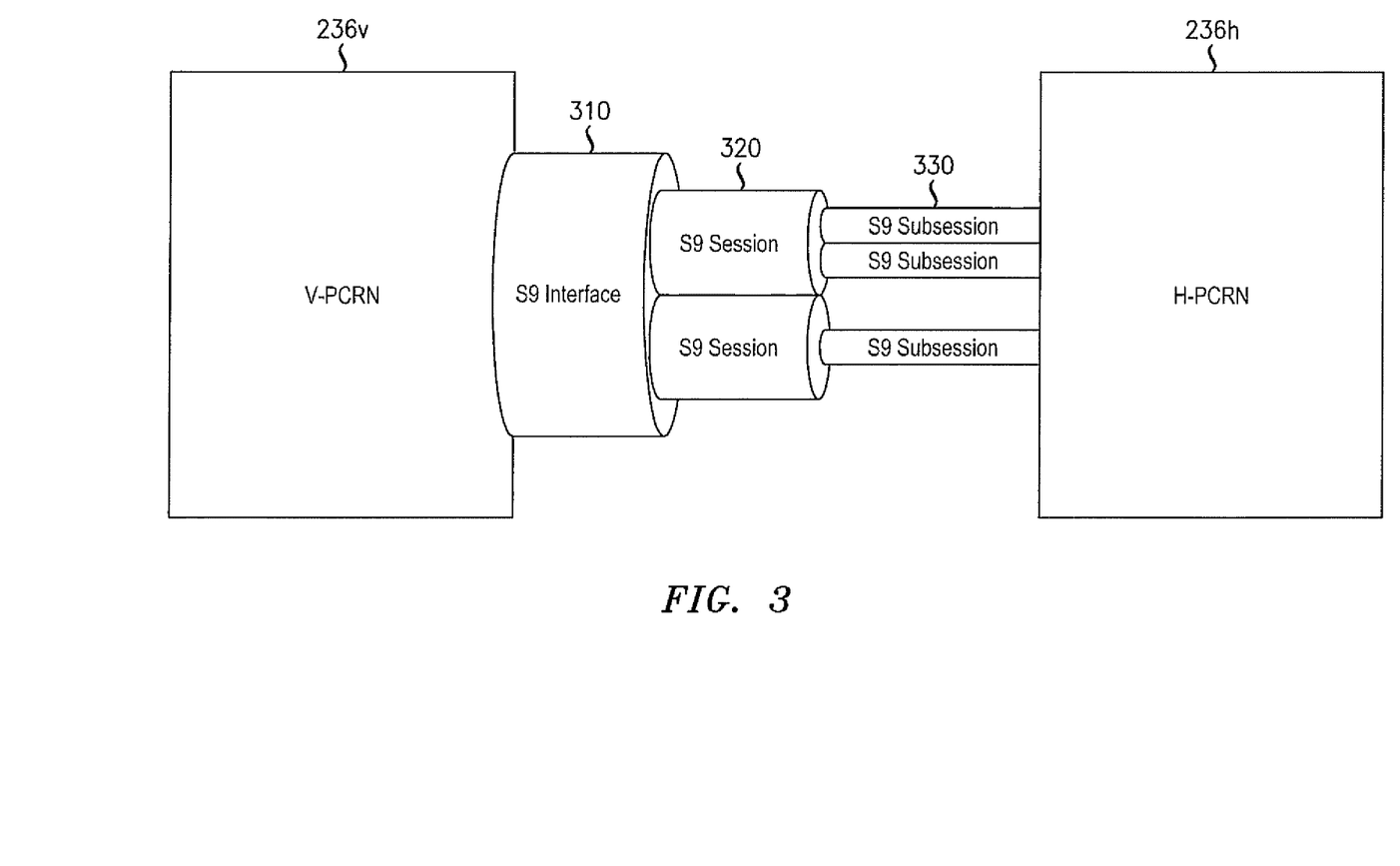
FIG. 3 illustrates an exemplary interface between a visited policy and charging rules node (PCRN) and a home PCRN.

FIG. 3 illustrates an exemplary interface 310 between a visited PCRN 236v and a home PCRN 236h. Interface 310 may be an S9 interface. Interface 310 may be used for communicating session establishment requests, provisioned rules, and other information between a visited PCRN 236v and a home PCRN 236h of a subscriber. Interface 310 may use messages according to the Diameter protocol as described in the 3GPP TS 129.215 specification.

Interface 310 may include zero or more S9 sessions 320. An S9 session 320 may correspond to a roaming subscriber or a roaming subscriber's user equipment. PCRN 236v may establish a new S9 session 320 with PCRN 236h whenever a roaming subscriber seeks to establish a connection through EPC 230v. PCRN 236v or PCRN 236h may terminate an S9 session 320 whenever the roaming subscriber disconnects from EPC 230v.

S9 session 320 may include zero or more S9 subsessions 330. An S9 subsession may correspond to an IP-CAN session of a user equipment of a roaming subscriber. An S9 subsession may be created whenever PCRN 236v receives a new request for a session. Information may be passed between PCRN 236v and PCRN 236h at the subsession level for the corresponding IP-CAN session. Alternatively, information may be passed at the session level for any IP-CAN session of a subscriber. PCRN 236v may monitor the number of S9 sessions and S9 subsessions for each PCRN 236h and/or each roaming partner.

Figure 4:
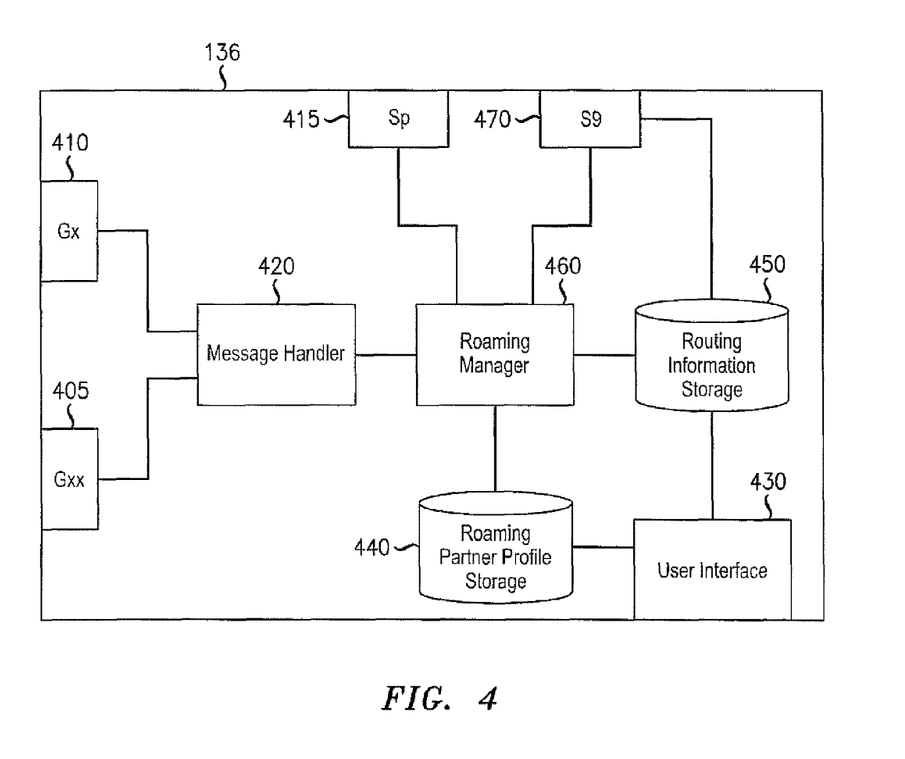
FIG. 4 illustrates an exemplary PCRN for providing service to a roaming subscriber as a visited PCRN.

FIG. 4 illustrates an exemplary visited PCRN 136 for providing service to a roaming subscriber. PCRN 136 may act as both a visited PCRN such as PCRN 236v and as a home PCRN such as PCRN 236h. PCRN 136 may include Gxx interface 405, Gx interface 410, Sp interface 215 message handler 420, user interface 430, roaming partner profile storage 440, routing information storage 450, roaming manager 460, and S9 interface 470.

Gxx interface 405 may be an interface comprising hardware and/or executable instructions encoded on a machine-readable storage medium configured to communicate with a SGW such as SGW 232v. Such communication may be implemented according to the 3GPP TS 29.212. Thus, Gxx interface 405 may receive requests for QoS rules and transmit QoS rules for installation. Gxx interface 405 may further receive UE-originated application requests, session requests, and event notifications in the form of a credit control request (CCR).

Gx interface 410 may be an interface comprising hardware and/or executable instructions encoded on a machine-readable storage medium configured to communicate with a PGW such as PGW 234v. Such communication may be implemented according to the 3GPP TS 29.212. Thus, Gx interface 410 may receive requests for PCC rules and transmit PCC rules for installation. Gx interface 410 may further receive UE-originated application requests, session requests, and event notifications in the form of a CCR.

Sp interface 415 may be an interface comprising hardware and/or executable instructions encoded on a machine-readable storage medium configured to communicate with an SPR such as SPR 138. Sp interface 415 may query SPR 138 with a subscription identifier. Sp interface 415 may receive a subscriber record from SPR 138. In various exemplary embodiments, Sp interface 415 may be a network interface and communicate with a remote SPR. In various alternative embodiments, the SPR may be a local database within PCRN 136, and Sp interface 415 may query the local database.

Message handler 420 may include hardware and/or executable instructions encoded on a machine-readable storage medium configured to process rule requests sent and/or received via Gxx interface 405 and/or Gx interface 410. For example, message handler 420 may receive a rule request from PGW 234v for a roaming subscriber. After PCRN 136 makes a policy decision, message handler 420 may construct and transmit a message over Gxx interface 405 and/or Gx interface 410 to notify other nodes as to the result of the policy decision. For example, if PCRN 136 creates a new PCC rule according to an applicable policy, message handler 420 may construct a reauthorization request (RAR) message to push the new PCC rule to an appropriate PGW.

User interface 430 may include hardware and/or executable instructions encoded on a machine-readable storage medium configured to provide a network operator with access to PCRN 136. User interface 430 may receive input from a network operator and may include hardware such as, for example, a keyboard and/or mouse. User interface 430 may also display information as output to the network operator and may include, for example, a monitor. A network operator may access roaming partner profile storage 440 via user interface 430. User interface 430 may provide a network operator with various options for creating roaming partner profiles. A network operator may also configure routing information storage 450 via user interface 430.

Roaming partner profile storage 440 may include any machine-readable medium capable of storing roaming agreements for use by PCRN 136. Accordingly, roaming partner profile storage 440 may include a machine-readable storage medium such as read-only memory (ROM), random-access memory (RAM), magnetic disk storage media, optical storage media, flash-memory devices, and/or similar storage media. As will be described in further detail below with respect to FIG. 5, roaming partner profile storage 440 may store numerous roaming partner profiles. Roaming partner profile storage 440 may include a cache for storing roaming agreements that are used frequently.

Routing information storage 450 may include any machine-readable medium capable of storing routing information for use by PCRN 236v. Accordingly, routing information storage 450 may include a machine-readable storage medium such as read-only memory (ROM), random-access memory (RAM), magnetic disk storage media, optical storage media, flash-memory devices, and/or similar storage media. Routing information storage 450 may include routing information for sending messages to various network nodes and other networks. For example, routing information storage may include a mapping of realms and applications to peer nodes. In various alternative embodiments, routing information storage 450 may be part of roaming partner profile storage 440.

Roaming manager 460 may include hardware and/or executable instructions encoded on a machine-readable storage medium configured to process requests for service for a roaming subscriber. When acting as a visited PCRN, PCRN 136 may receive a request in the form of a CCR message received via Gx interface 405 or Gxx interface 410. Roaming manager 460 may determine whether the request is for a roaming subscriber whose HPLMN has made a contractual roaming agreement with the VPLMN. Accordingly, roaming manager 460 may extract a subscription identifier from the request for service. Roaming manager 460 may compare the extracted subscription identifier with various network identifiers stored in the roaming partner profile storage 440. Roaming manager 460 may use information stored in roaming partner profile storage 440 and routing information storage 450 to establish a communication session with a home PCRN, such as PCRN 236h, of the subscriber over S9 interface 470. Roaming manager 460 may forward any information included in the service request to the home PCRN via the S9 interface. A more detailed description of an exemplary method including steps performed by roaming manager 460 will be provided below with respect to FIG. 6.

Roaming manager 460 may also process requests from a roaming partner device when PCRN 136 acts as a home PCRN such as PCRN 236h. PCRN 136 may receive a request in the form of a CCR message from a visited PCRN 236v via S9 interface 470. Roaming manager 460 may determine whether the request is from a roaming partner who has made a contractual roaming agreement with the HPLMN. Accordingly, roaming manager 460 may extract an origin realm from the received message. Roaming manager 460 may compare the origin realm with a set of realms in each roaming partner profile. If the origin realm matches a roaming partner profile, roaming manager 460 may generate one or more PCC rules and respond to the request. Roaming manager 460 may obtain a subscriber record via Sp interface 415 when generating the one or more PCC rules.

S9 interface 470 may be an interface comprising hardware and/or executable instructions encoded on a machine-readable storage medium configured to communicate with another PCRN. When PCRN 136 acts as a visited PCRN, S9 interface 470 may be used to establish an S9 session with a home PCRN such as PCRN 236h. When PCRN 136 acts as a home PCRN, S9 interface 470 may receive an S9 session request from a visited PCRN such as PCRN 236v. Such communication may be implemented according to the 3GPP TS 29.215. Thus, S9 interface 470 may forward requests for PCC/QoS rules to a partner device and receive PCC/QoS rules from a partner device for installation in the VPLMN. S9 interface 470 may include an S9 session for each roaming UE connected to the VPLMN. The partner devices may use the established S9 session for monitoring and updating the subscriber's connection while the UE is attached to the VPLMN. As described above regarding FIG. 3, an S9 session may include multiple S9 subsessions if a roaming subscriber UE uses more than one IP-CAN session.

S9 interface 470 may also be used when PCRN 136 acts as a home PCRN such as PCRN 236h. S9 interface 470 may receive requests for PCC/QoS rules from a partner device and send PCC/QoS rules to the partner device for installation in the VPLMN. S9 interface 470 may also include an S9 session for each subscriber UE of the HPLMN connected to another VPLMN.

Figure 5:
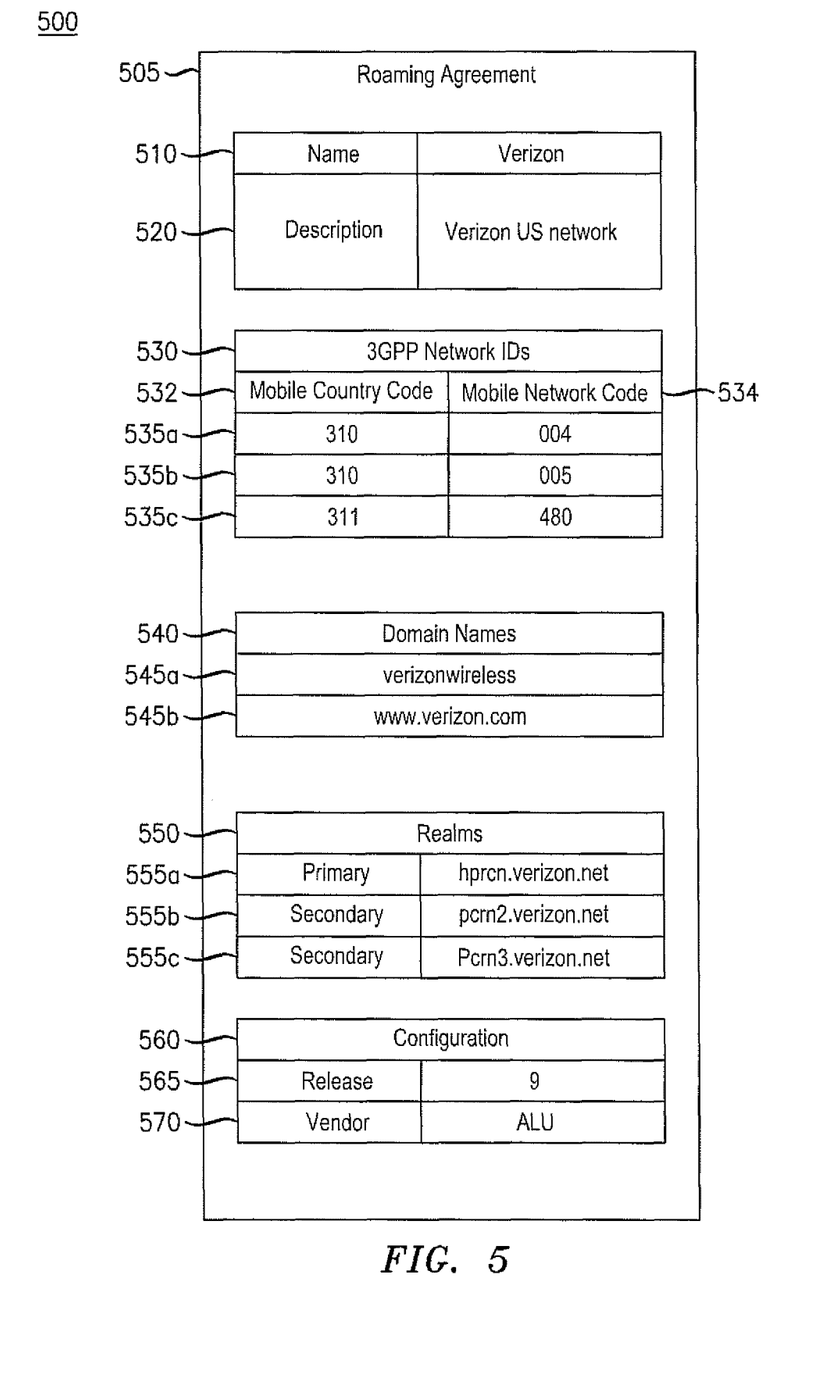
FIG. 5 illustrates an exemplary data structure for storing a roaming partner profile.

FIG. 5 illustrates an exemplary data structure 500 for storing information about an exemplary roaming partner profile 505. It should be apparent that data structure 500 may be implemented using a variety of data structures such as, for example, objects, arrays, linked lists, or trees. Data structure 500 may be stored in roaming partner profile storage 440 or another computer-readable storage medium accessible to PCRN 136.

Exemplary roaming partner profile 505 may be one possible roaming partner profile used by PCRN 136. Roaming partner profile 505 may be configured by a network operator using user interface 430 or may be imported from a computer-readable storage medium or other source. It should be apparent that PCRN 136 may use multiple roaming partner profiles. PCRN 136 may include one roaming partner profile for each other service provider that has made a roaming agreement with the operator of PCRN 136. Roaming partner profile 505 may include multiple fields including name 510, description 520, set of 3GPP Network IDs 530, set of domain names 540, set of realms 550, configuration information 560.

Name 510 may indicate a unique name for the roaming partner profile. Name 510 may be used to identify the particular roaming partner. Name 510 may be set by a network operator configuring the roaming partner profile. Exemplary roaming partner profile 505 may be named "Verizon" as indicated by name 510. Description 520 may include a textual description of the roaming partner. Description 520 may provide a network operator or other person viewing roaming partner profile 505 with an explanation of the roaming partner. For example, description 520 may indicate that exemplary roaming partner profile 505 is for Verizon's US network.

The set of 3GPP Network IDs 530 may include a set of network IDs used by the roaming partner. A 3GPP network ID may be part of an IMSI number used to identify a subscriber. A 3GPP network ID may include a Mobile Country Code (MCC) 532 and a Mobile Network Code (MNC) 534. A roaming partner may use multiple MCCs and multiple MNCs within the same country. The set of 3GPP Network IDs 530 may include entries 535. Each entry 535 may include a MCC/MNC pair. Exemplary roaming partner profile 505 may include three entries 535a-c. Exemplary entry 535a may indicate the roaming partner uses an MCC/MNC combination "310/004". Exemplary entry 535b may indicate the roaming partner uses an MCC/MNC combination "310/005". Exemplary entry 535c may indicate the roaming partner uses an MCC/MNC combination "311/480". Additional entries 535 may be included for other MCC/MNC combinations.

The set of domain names 540 may include a set of domain names used by the roaming partner. A domain name may be used by a roaming partner as part of a Network Access Identifier user to identify a subscriber. The set of domain names 540 may include any domain name or variation of spelling used by the roaming partner. Exemplary roaming partner profile 505 may include two entries 545a and 545b. Exemplary entry 545 a may indicate that the roaming partner uses "verizonwireless" as a domain name. Exemplary entry 545b may indicate that the roaming partner uses "www.verizon.com" as a domain name. Additional entries 545 may be included for additional domain names and/or alternative spellings.

The set of realms 550 may include a set of realms used by the roaming partner. The realm may provide an address to be used for communicating with the roaming partner. A realm may be a fully qualified domain name (FQDN) that unambiguously designates a Diameter realm of the roaming partner. A realm may follow the naming convention described in 3GPP TS 23.003. For example, a realm may be designated "gan.mnc123.mcc310.3gppnetwork.org."

A realm may be a primary realm or a secondary realm. The primary realm may indicate a Diameter realm that the roaming partner has indicated should receive all requests for roaming subscribers. Routing information storage 450 may include routing information for sending messages to the primary realm. Each roaming partner profile 500 may include only a single primary realm.

Secondary realms may indicate the realm of a PCRN that may act as a visited PCRN and send requests to PCRN 136 when it acts as a home PCRN. The roaming partner profile 500 may include a secondary realm for each Diameter realm used to send messages from a roaming partner. If the roaming partner profile 500 does not include a primary realm or a secondary realm matching an origin realm of a received S9 request, PCRN 136 may reject the request.

Exemplary set of realms 550 may include exemplary entries 555a-c. Exemplary entry 555a may indicate that the roaming partner uses "hprcn.verizon.net" as the primary realm for receiving requests for roaming sessions. Exemplary entry 555b may indicate that the roaming partner uses "pcrn2.verizon.net" as a secondary realm. Exemplary entry 555b may indicate that the roaming partner uses "pcrn3.verizon.net" as a secondary realm.

Configuration information 560 may indicate other useful information about the roaming partner. For example, release 562 may indicate a specification version number that the roaming partner supports. This information may be used to ensure compatibility. As another example, vendor 564 may indicate a vendor of equipment such as the PCRN used by the roaming provider.

Figure 6:
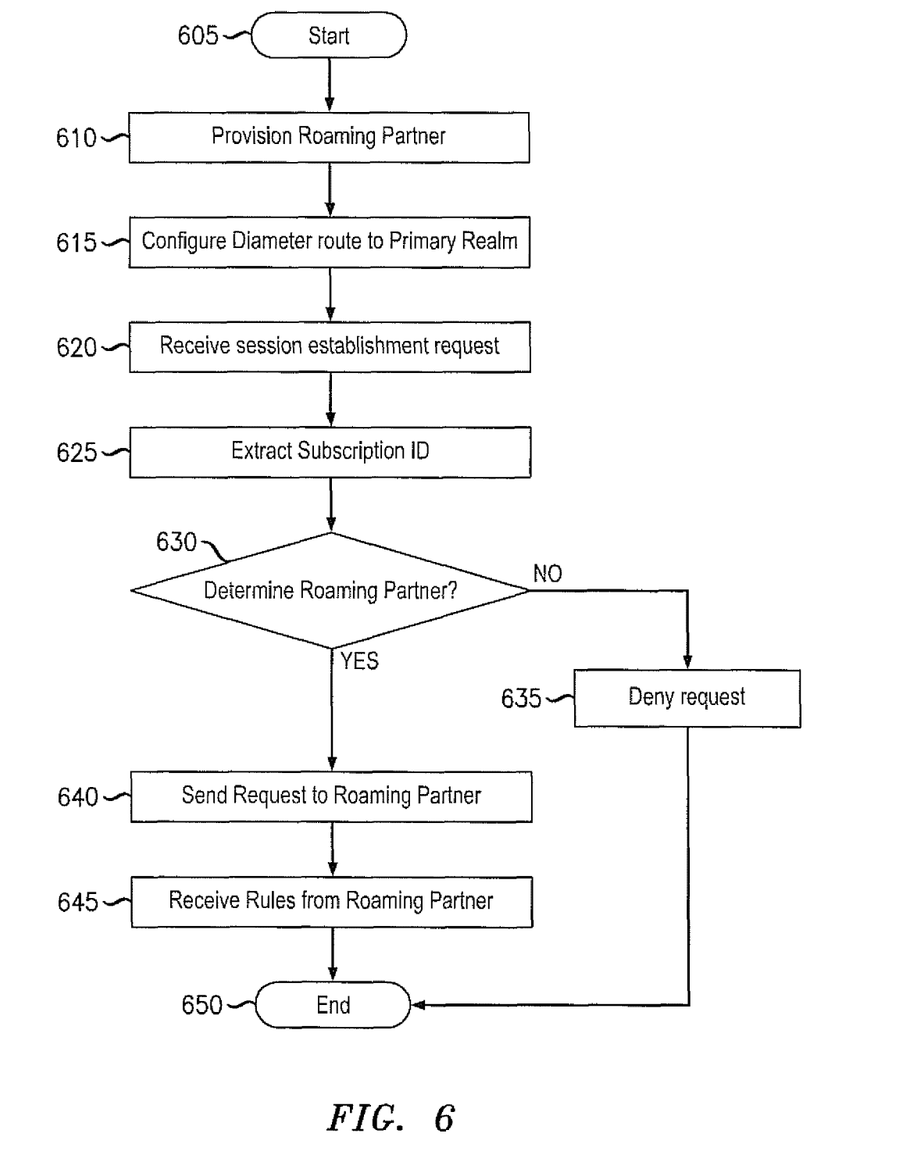
FIG. 6 illustrates a flowchart showing an exemplary method of managing a connection for a roaming subscriber at a visited PCRN.

FIG. 6 illustrates a flowchart showing an exemplary method 600 of managing a connection for a roaming subscriber at PCRN acting as a visited PCRN. Method 600 may be performed by the various components of PCRN 136 or PCRN 236v including: message handler 420 and roaming manager 460. Method 600 may begin at step 605 and proceed to step 610.

In step 610, PCRN 136 may provision one or more roaming partner profiles. A network operator may use user interface 430 to configure a roaming partner profile in roaming partner profile storage 450. In particular, the network operator may configure a primary realm for the roaming partner. The primary realm may be associated with a MCC and MNC. The network operator may choose a realm that the roaming partner has indicated is publicly addressable for receiving S9 session requests. The service providers may have agreed which realms are publicly addressable as part of their contractual roaming agreement. The method may then proceed to step 615, where the network operator may use user interface 430 to configure Diameter routing information for the primary realm. The routing information may include a peer node for determining a route for sending messages to the primary realm. The method may then proceed to step 620.

In step 620 PCRN 136 may receive a session establishment request for a roaming subscriber via Gxx interface 405 or Gx interface 410. The method may then proceed to step 625, where PCRN 136 may extract a subscription identifier from the received request. PCRN 136 may determine that the session establishment request is for a roaming subscriber if the subscription identifier indicates that the subscriber does not belong to the home network of PCRN 136. The method may then proceed to step 630.

In step 630, PCRN 136 may determine to which roaming partner the roaming subscriber belongs. PCRN 136 may compare the subscription identifier to the various fields of roaming partner profile 500 to determine the roaming partner. For example, PCRN 136 may compare the first five or six digits of an IMSI number to the set of 3GPP network IDs 530. If the subscriber ID is an NAI, PCRN 136 may compare the domain portion of the NAT to the set of domain names 540. If PCRN 136 is able to match the subscription identifier to a network identifier of a roaming partner profile, the method 600 may proceed to step 640. If PCRN 136 is unable to find a matching roaming partner, PCRN 136 may deny the request to establish a session in step 635.

In step 640, PCRN 136 may send a message to the roaming partner via the S9 interface. PCRN 136 may generate a CCR message requesting a new S9 session for the roaming subscriber. PCRN 136 may set the destination-realm field of the CCR to the primary realm of the identified roaming partner. The primary realm may be different than a realm associated with an IMSI of the subscriber. For example, the IMSI may be associated with one of the secondary realms, but PCRN 136 may establish an S9 session with the primary realm. PCRN 136 may use the route information storage 450 to determine a Diameter peer node to first send the CCR message. The method may then proceed to step 645.

In step 645 PCRN 136 may receive a response to the CCR message from a partner device within the primary realm of the roaming partner. PCRN 136 may extract PCC/QoS rules from the received response and install the rules in the VPLMN. Thus, PCRN 136 may provide service to the roaming subscriber. The method may then proceed to step 650, where the method ends.

Figure 7:
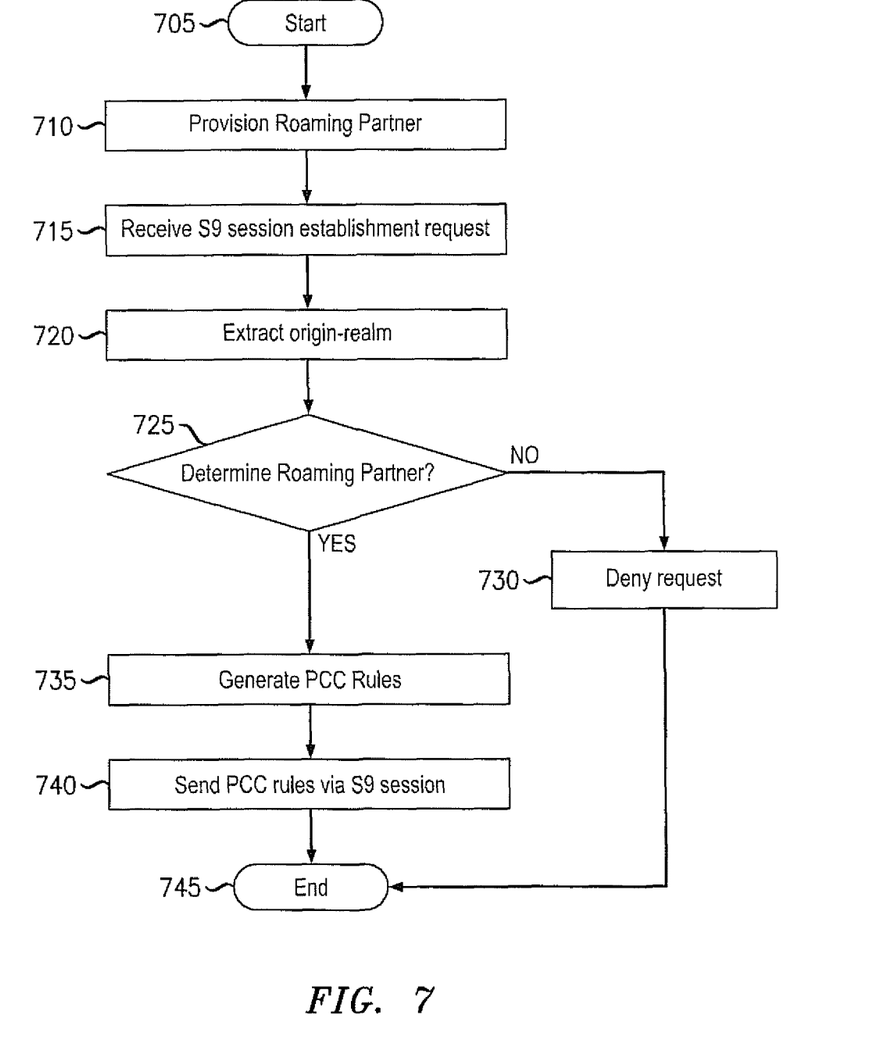
FIG. 7 illustrates a flowchart showing an exemplary method of managing a connection for a roaming subscriber at a home PCRN.

FIG. 7 illustrates a flowchart showing an exemplary method 700 of managing a connection for a roaming subscriber at a home PCRN 236*h*. Method 700 may be performed by the various components of PCRN 136 or PCRN 236*h* including: message handler 420 and roaming manager 460. Method 700 may begin at step 705 and proceed to step 710.

In step 710, PCRN 136 may provision one or more roaming partner profiles. A network operator may use user interface 430 to configure a roaming partner profile in roaming partner profile storage 450. In particular, the network operator may configure a plurality of realms for the roaming partner. The network operator may configure an entry in the set of realms 550 for each realm of the roaming partner that may request an S9 session with PCRN 136. The service providers may have agreed which realms will be used as part of their contractual roaming agreement. The method 700 may then proceed to step 715, In step 715, PCRN 136 may receive a CCR message requesting an S9 session for a roaming subscriber. The CCR message may have originated at a roaming partner's visited PCRN. In step 720, PCRN 136 may extract an origin realm from the CCR message. The origin realm may indicate the realm of the PCRN that sent the CCR message. In various alternative embodiments, the origin realm may have been altered to a different realm of the roaming partner. The method may then proceed to step 725.

In step 725, PCRN 136 may determine whether the received CCR message is from a roaming partner. PCRN 136 may compare the origin realm to the set of realms 550 for each roaming partner. If the origin realm matches any realm of a roaming partner, either primary or secondary, PCRN 136 may determine that the message is from that roaming partner. If PCRN 136 identifies a roaming partner, the method 700 may proceed to step 735. If PCRN 136 is unable to identify the origin realm as belonging to a roaming partner, PCRN 136 may deny the session request in step 730.

In step 735, PCRN 136 may generate PCC/QoS rules for the roaming subscriber. PCRN 136 may generate the PCC/QoS rules using information from the CCR message, the roaming partner profile, and a subscriber record accessed via SP interface 420. PCRN 136 may consider the fact that the subscriber is roaming when generating the PCC/QoS rules. The method may then proceed to step 740.

In step 740, PCRN 136 may send the PCC/QoS rules to the origin realm that requested the S9 session. PCRN 136 may send the PCC/QoS rules within the established S9 session using the origin realm and path information included in the CCR message. The PCC/QoS rules, if installed in the VPLMN, may provide the subscriber with the requested access to the server and charge the subscriber appropriately. If the partner device does not accept the PCC/QoS rules, PCRN 136 may receive a second message within the S9 session. PCRN may then either send new PCC/QoS rules or deny the session request. The method may then proceed to step 745, where the method ends.

According to the foregoing, various exemplary embodiments provide for methods for providing network service to a roaming subscriber. In particular, by organizing roaming partner realms into primary and secondary realms, the PCRN negotiate the service for the roaming subscriber with the network of a roaming partner.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) of communicating with a roaming partner, the method comprising:
   defining a roaming partner profile including:
   a network identifier,
   a primary realm indicating an address designated by the roaming partner to receive requests for roaming subscribers, and a secondary realm indicating a second address of the roaming partner;

receiving a session establishment request at the PCRN from a roaming subscriber;

extracting a subscription identifier from the session establishment request;

determining an active roaming partner by comparing the subscription identifier to the at least one network identifier of the roaming partner profile; and establishing an S9 session with the primary realm of the active roaming partner by forwarding the session establishment request to the roaming partner.

2. The method of claim 1, wherein the subscription identifier includes a combination of Mobile Country Code (MCC) and a Mobile Network Code (MNC) that corresponds to a secondary realm, wherein the primary realm is associated with a different combination of MCC and MNC than the subscription identifier and the secondary realm.

3. The method of claim 1, wherein the primary realm is the only publicly addressable realm of the roaming partner.

4. The method of claim 1, further comprising configuring a Diameter route for only the primary realm of a roaming partner.

5. The method of claim 4, wherein the roaming partner internally routes Diameter messages to a secondary realm.

6. A method performed by a policy and charging rules node (PCRN) of communicating with a roaming partner, the method comprising:

defining a roaming partner profile including: a primary realm indicating an address designated by the roaming partner to receive requests for roaming subscribers and at least one secondary realm;

receiving an S9 session establishment request from a roaming partner via an S9 interface;

extracting an origin realm from the S9 session establishment request;

determining the active roaming partner by comparing the origin realm to the primary realm and the at least one secondary realm of the roaming partner profile; and responding to the S9 session establishment request based on the active roaming partner.

7. The method of claim 6, wherein the step of responding to the S9 session establishment request comprises sending a message to the origin realm of the received S9 session establishment request.

8. The method of claim 6, wherein the step of responding to the S9 session establishment request comprises generating a PCC rule providing a roaming subscriber with access to a network and sending the PCC rule to the roaming partner.

9. The method of claim 6, wherein the step of responding to the S9 session establishment request comprises denying the S9 session establishment request if the origin realm does not correspond to a roaming partner.

10. A tangible and non-transitory machine-readable storage medium encoded with instructions thereon for execution by a network element of a telecommunication network, wherein said tangible and non-transitory machine-readable storage medium comprises:

instructions for defining a roaming partner profile including:
a network identifier,
a primary realm indicating an address designated by the roaming partner to receive requests for roaming subscribers, and
a secondary realm indicating a second address of the roaming partner;

instructions for receiving a session establishment request at the PCRN;

instructions for extracting a subscription identifier from the session establishment request;

instructions for determining an active roaming partner by comparing the subscription identifier to the at least one network identifier of the roaming partner profile; and instructions for establishing an S9 session with the primary realm of the active roaming partner by forwarding the session establishment request to the roaming partner.

11. The tangible and non-transitory machine-readable storage medium of claim 10, wherein the subscription identifier includes a combination of Mobile Country Code (MCC) and a Mobile Network Code (MNC) that corresponds to a secondary realm, wherein the primary realm is associated with a different combination of MCC and MNC than the subscription identifier and the secondary realm.

12. The tangible and non-transitory machine-readable storage medium of claim 10, wherein the primary realm is the only publicly addressable realm of the roaming partner.

13. The tangible and non-transitory machine-readable storage medium of claim 10, further comprising instructions for configuring a Diameter route for only the primary realm of a roaming partner.

14. The tangible and non-transitory machine-readable storage medium of claim 13, wherein the roaming partner internally routes Diameter messages to a secondary realm.

15. A tangible and non-transitory machine-readable storage medium encoded with instructions thereon for execution by a network element of a telecommunication network, wherein said tangible and non-transitory machine-readable storage medium comprises:

instructions for defining a roaming partner profile including a primary realm indicating an address designated by the roaming partner to receive requests for roaming subscribers and at least one secondary realm;

instructions for receiving an S9 session establishment request via an S9 interface;

instructions for extracting an origin realm from the S9 session establishment request;

instructions for determining an active roaming partner by comparing the origin realm to the primary realm and the at least one secondary realm of the roaming partner profile; and instructions for responding to the S9 session establishment request based on the active roaming partner.

16. The tangible and non-transitory machine-readable storage medium of claim 15, wherein the instructions for responding to the S9 session establishment request comprise instructions for sending a message to the origin realm of the received S9 session establishment request.

17. The tangible and non-transitory machine-readable storage medium of claim 15, wherein the instructions for responding to the S9 session establishment request comprise instructions for generating a PCC rule providing a roaming subscriber with access to a network.

18. The tangible and non-transitory machine-readable storage medium of claim 15, wherein the instructions for responding to the S9 session establishment request comprise instructions for denying the S9 session establishment request if the origin realm does not correspond to a roaming partner.

* * * * *